United States Patent [19]

Carlos

[11] 4,388,244

[45] Jun. 14, 1983

[54] PETROLATUM OR HYDROCARBON WAX OXIDATE COMPOSITION

[75] Inventor: Donald D. Carlos, Louisville, Ky.

[73] Assignee: Ashland Oil, Inc., Ashland, Ky.

[21] Appl. No.: 271,906

[22] Filed: Jun. 9, 1981

[51] Int. Cl.$^3$ ............................................. C09F 7/00
[52] U.S. Cl. ............................. 260/404.5; 260/404; 260/406; 544/386; 544/225; 252/51.5 A
[58] Field of Search ............... 252/51.5 A; 260/404.5; 544/386, 225

[56] References Cited

U.S. PATENT DOCUMENTS

| | | | |
|---|---|---|---|
| 3,216,936 | 11/1965 | Le Suer | 260/404.5 PA X |
| 3,385,858 | 5/1968 | Katz | 544/386 |
| 3,451,931 | 6/1969 | Kaan et al. | 260/404.5 PA X |
| 3,483,237 | 12/1969 | Peerman et al. | 260/404.5 PA |
| 3,787,374 | 1/1974 | Adams | 544/386 X |
| 4,186,077 | 1/1980 | Carlos | 260/406 X |
| 4,192,812 | 5/1980 | Carlos | 260/406 |
| 4,198,285 | 4/1980 | Carlos | 260/406 X |

*Primary Examiner*—Paul F. Shaver
*Attorney, Agent, or Firm*—Richard C. Willson, Jr.; Charles A. McCrae

[57] ABSTRACT

A petrolatum or hydrocarbon wax oxidate composition which comprises the reaction product of (a) a petrolatum or hydrocarbon wax oxidate, as described herein, or the metal salt thereof, with (b) a polyamine, as described herein, wherein the petrolatum or hydrocarbon wax oxidate composition has a very high viscosity, increased molecular weight and sinewy characteristics and is useful as a lubricant, grease, or protective coating.

39 Claims, No Drawings

PETROLATUM OR HYDROCARBON WAX OXIDATE COMPOSITION

FIELD OF THE INVENTION

This invention relates to a petrolatum or hydrocarbon wax oxidate composition and to a method for producing the same. More specifically, this invention relates to a petrolatum or hydrocarbon wax oxidate composition which comprises the reaction product of (a) a petrolatum or hydrocarbon wax oxidate, as described herein, or the metal salt thereof, with (b) a polyamine, as described herein, wherein the petrolatum or hydrocarbon wax oxidate composition has a very high viscosity, increased molecular weight and sinewy characteristics.

BACKGROUND OF THE INVENTION

Oxidized petroleum fractions, which fractions include waxes and petrolatums, are known as a source of saponifiable material useful in the production of lubricating greases and in the formulation of protective coatings.

Highly oxidized petroleum fractions and processes for their production are described in U.S. Pat. Nos. 4,186,077 and 4,198,285 of the inventor herein. Oxidation of petroleum fractions, e.g., petrolatums, utilizing the processing conditions described in these two U.S. patents provides oxidates having high acid numbers which have advantageous properties over oxidates produced in accordance with previous oxidation techniques.

While oxidates produced conventionally and in accordance with the processes disclosed in the above-described U.S. patents have advantageous properties, the viscosity, molecular weight and integrity of these oxidate products are not completely sufficient for all applications and improvements in these and other characteristics of oxidate products are desired.

SUMMARY OF THE INVENTION

Accordingly, an object of this invention is to provide a petrolatum or hydrocarbon wax oxidate composition having high viscosity.

Another object of this invention is to provide a petrolatum or hydrocarbon wax oxidate composition having an increased molecular weight.

A further object of this invention is to provide a process for producing the high-viscosity petrolatum or hydrocarbon wax oxidate composition.

An even further object of this invention is to provide a process for increasing the molecular weight and viscosity of a petrolatum or hydrocarbon wax oxidate.

Also, an object of this invention is to provide compositions containing the high-viscosity petrolatum or hydrocarbon wax oxidate composition where the compositions are useful as lubricants, greases, corrosion inhibitor compositions, protective coating compositions and the like.

These and other objects are achieved by the invention described herein.

In one embodiment of this invention, this invention provides a petrolatum or hydrocarbon wax oxidate composition which comprises the reaction product of (a) a hydrocarbon wax oxidate and/or a petrolatum oxidate with (b) a polyamine having at least two amino groups, each of which has at least one active hydrogen atom, or the metal salt of such reaction product.

In a further embodiment of this invention, this invention provides a method of producing a high-viscosity petrolatum or hydrocarbon wax oxidate composition comprising reacting (a) a hydrocarbon wax oxidate and/or a petrolatum oxidate with (b) a polyamine having at least two amino groups, each of which has at least one active hydrogen atom and (c) a metal salt forming compound to produce the reaction product or the metal salt thereof described above.

An even further embodiment of this invention provides a method for altering the characteristics of petrolatum or hydrocarbon wax oxidates or the metal salts thereof comprising reacting the petrolatum and/or hydrocarbon wax oxidate or metal salt thereof with a polyamine having at least two amino groups, in which each amino group has at least one active hydrogen atom.

DETAILED DESCRIPTION OF THE INVENTION

In this invention, the starting material used is a hydrocarbon wax oxidate and/or a petrolatum oxidate or a metal salt thereof. Such a hydrocarbon wax oxidate basically comprises the oxidation product having a high acid number obtained on oxidizing a petrolatum, a hydrocarbon wax or a mixture of a petrolatum and a hydrocarbon wax.

Exemplary petrolatum and hydrocarbon wax starting materials and techniques for producing by oxidation the petrolatum or hydrocarbon wax oxidate used in this invention are described in U.S. Pat. No. 4,186,077 and U.S. Pat. No. 4,198,285, issued to the inventor herein, the disclosure of which is incorporated herein by reference.

Particularly, suitable hydrocarbon feed stocks which can be used and oxidized to obtain the petrolatum or hydrocarbon wax oxidate suitable for use in this invention are hydrocarbons comprising a mixture of straight and branched chain saturated hydrocarbons having on the average 20 to 100 carbon atoms per molecule. In particular, preferred petrolatums and hydrocarbon waxes which can be oxidized to produce a particularly useful starting material in this invention are petrolatums containing about 40 to about 100 carbon atoms and hydrocarbon waxes containing about 20 to about 44 carbon atoms.

Suitable petrolatum and/or hydrocarbon wax oxidates which can be used in this invention can be appropriately prepared by oxidizing these hydrocarbon feed stocks as described above using processes known in the art. Such a petrolatum or hydrocarbon wax oxidate has been oxidized to a sufficient extent to be suitable for use herein if the oxidate has an acid number of about 20 to about 150, preferably about 40 to about 50 for a petrolatum oxidate and about 80 to about 100 for a hydrocarbon wax oxidate. For mixtures of hydrocarbon wax oxidates and petrolatum oxidates, a suitable acid number will be generally proportional to the proportion of the hydrocarbon wax oxidate and the petrolatum oxidate present. As used herein, the term "acid number" is defined to mean the number of milligrams of potassium hydroxide required to neutralize 1 gram of sample.

As set forth above, a hydrocarbon wax oxidate and/or a petrolatum oxidate or a metal salt thereof can be used as a starting material in this invention. For simplicity in the disclosure to be given hereinafter, the term "oxidate" will be employed throughout and such term is intended to include not only the hydrocarbon wax oxidate per se, the petrolatum oxidate per se and mixtures thereof but also to include the metal salt thereof.

As described above, the hydrocarbon wax or petrolatum starting material is simply oxidized using conventional known techniques, for example, using conventional redox catalysts such as manganese salts. Further, the technique disclosed in U.S. Pat. No. 4,186,077, in which an oxidate is obtained by blowing an oxidizing gas through a liquid mass of the hydrocarbon in the presence of an amine oxide under the conditions as described therein, can be used. Alternatively, an oxidate appropriate for use in this invention can be obtained by oxidizing a hydrocarbon in accordance with the procedure described in U.S. Pat. No. 4,198,285 by blowing an oxidizing gas through a liquid mass of the hydrocarbon in the presence of a sulfobetaine.

To produce the high viscosity oxidate composition of this invention, it is only necessary to react the oxidate with a polyamine having at least two amino groups in which each of the groups has at least one active hydrogen atom.

Suitable polyamines which can be employed include diamines, triamines, tetramines, pentamines and higher polyamines. For simplicity in the disclosure hereinafter, the term "polyamine" will be employed to describe suitable amines which can be employed having at least two amino functional groups, each group of which has at least one active hydrogen atom. Specific examples of appropriate polyamines which can be employed include aliphatic and alicyclic polyamines such as monoethylene diamine (MEDA), diethylene triamine (DETA), triethylene tetramine (TETA), tetraethylene pentamine (TEPA), sym.-dimethylethylene diamine, hexamethylene diamine (HMDA), N,N'-diethylethylene diamine, 1,3-(or 1,2-)diaminopropane, 1,4-diaminobutane, 1,2-diaminocyclohexane, 1,10-diaminodecane, 1,12-diaminododecane, 1,7-diaminoheptane, 1,3-diamino-N-(b-hydroxyethyl)-propane, 1,3-diamino-2-hydroxypropane, 1,5-diaminopentane, 1,8-diaminooctane, 1,2-diamino-2-methylpropane, 1,8-diamino-p-menthane, diaminomaleonitrile, N-methylethylene diamine, N-ethylethylene diamine, N,N'-diethyl-2-butene-1,4-diamine, m-xylylene diamine, 1,6-hexane diamine, N,N'-dimethyl-1,6-hexane diamine, 2,5-dimethyl-2,5-hexane diamine, and the like, aromatic polyamines such as o-(or m- or p-)phenylene diamine, 4,5-dimethyl-o-phenylene diamine, 2,4-(or 2,6- or 3,4-)diaminotoluene, 4-chloro-m-phenylene diamine, 3,4-(or 3,5-)diaminobenzoic acid, 4,4-diaminodiphenyl amine, 3,4-diaminobenzophenone, 4,4'-diaminostilbene, 3,3'-diaminobenzidine, 2,5-diaminobenzenesulfonic acid, 4,4'-methylenedianiline, 1,2-(or 1,4-; 1,5- or 2,6-)diaminoanthraquinone, 3,6-diaminoacridine, 4,5-diaminoacenaphthene, 2,3-(or 2,7-)diaminofluorene, 1,2-(or 1,5-; 1,8- or 2,3-)diaminonaphthalene, 9,10-diaminophenanthrene, 1,8-diamino-4,5-dihydroxyanthraquinone, 4-methoxy-o-phenylene diamine, 4,4'-diaminodiphenyl ether and the like, and heterocyclic polyamines such as 2,3-(or 2,6- or 3,4-)diaminopyridine, 3,5-diamino-2,6-dimethoxypyridine, N-(2-aminoethyl)-piperidine, 4-(aminomethyl)-piperidine, 4-amino-2,2,6,6-tetramethylpiperidine, 5-aminoindole, 6-aminoindoline, 4-amino-5-aminomethyl-2-methylpyrimidine, 4,5-diamino-6-hydroxypyrimidine, 4,6-diamino-5-nitropyrimidine, 4,5-(or 4,6-)diaminopyrimidine, 2,4,5,6-tetraaminopyrimidine, 2,4,6-triaminopyrimidine, 2-aminobenzimidazole, 3,4-diamino-5-hydroxypyrazole, 3,5-diamino-1,2,4-triazole, piperazine, and the like. Triethylene tetramine (TETA), diethylene triamine (DETA), tetraethylene pentamine (TEPA), piperazine, hexamethylene diamine (HMDA), monoethylene diamine (MEDA) are preferred with tetraethylene pentaamine being particularly preferred. Polyfunctional amino group containing nitrogen compounds from hydrogenated coal or shale oil can also be used as the polyamine.

From the above, it can be basically said that any polyamine having at least two amino groups in which each amino group contains at least one active hydrogen atom can be used as the polyamine in this invention. Other amino groups can be present as long as the polyamine has at least two amino groups as described above.

The reaction of the oxidate with the polyamine can be conducted at a temperature of about room temperature (e.g., about 20° to 30° C.) to a temperature just below the point at which the reactants would be thermally degraded, generally about 70° F. to about 350° F. (about 21° C. to about 176.5° C.), more generally, 200° F. to 250° F. (93° C. to 121° C.) under atmospheric pressure. Subatmospheric pressure or superatmospheric pressure can also be used, if desired.

The time of reaction for the polyamine with the oxidate is not critical and will vary depending on the reactants and the temperature employed. In general, an appropriate time of reaction can be determined by basically measuring the viscosity characteristics of the high viscosity oxidate composition of this invention produced. In general, high-viscosity oxidate compositions of this invention have a viscosity of about 1000 to about 250,000 CPS, more preferably about 2,500 to 35,000 CPS, at about 25° C.

The oxidate composition of this invention is considered to have a high-viscosity, i.e., a viscosity of about 1000 to about 250,000 CPS at about 25° C., which is markedly higher than the viscosity range generally encountered in prior art hydrocarbon wax or petrolatum oxidates of about 10 to about 200 CPS at about 25° C. and for the calcium salts thereof of about 200 to about 8000 CPS at about 25° C. Further, the viscosity of the oxidate composition of this invention can be adjusted by addition thereto of appropriate additives such as compatible solvents, if desired.

As indicated above, in one embodiment of this invention, by reacting the oxidate with a polyamine, the characteristics that the oxidate possessed prior to reaction with the polyamine are altered. For example, the viscosity of the oxidate used as a starting material is as indicated above and as can be seen from the viscosity range set forth above for the oxidate reaction product, the viscosity of the composition is markedly increased. Further, the oxidate reaction product has more sinewy characteristics than the oxidate starting material. Increased clarity and consistency are often obtained with the compositions of this invention. Where the composition of this invention is used as a protective coating or film, freedom from film graininess, improved film drying, improved film cohesiveness and improved corrosion and weather resistance are achieved.

In the reaction between the polyamine and the oxidate, an appropriate ratio of the oxidate to the polyamine is about 0.01% by weight to about 10% by weight, more preferably about 0.05% by weight to about 7% by weight, of the polyamine based on the weight of the oxidate.

The reaction product of the oxidate with the polyamine of this invention can be advantageously employed to produce greases, lubricants, corrosion inhibitor compositions, protective coatings, etc. Particularly, the oxidate reaction product is capable of forming a film which is free of graininess, which is cohesive and which does not crack. Accordingly, use of such as a grease or lubricant for machinery, automobiles, aircraft, marine craft, etc., as protective coatings for such or as a corrosion resistant composition to protect any type of metal surface from, e.g., oxidation, or other alteration, is particularly advantageous. The oxidate composition of this invention is useful in protecting metal surfaces from the effects of salt spray, humidity, and like external conditions which without such protection deleterious effects on the metal surfaces arise.

As indicated above, the oxidate of this invention can comprise the reaction product of a hydrocarbon wax oxidate with a polyamine or the metal salt of the reaction product of the oxidate and the polyamine. Where metal salts (sometimes designated a "soap") are desired, any basic metal salt can be used. Suitable metal salts include those of lithium, sodium, potassium, magnesium, rubidium, strontium, cesium, barium, cadmium, aluminum, tin, bismuth, zinc and mixtures thereof. Preferred salts, particularly for protective coating film applications, are zinc and calcium salts and appropriate basic calcium and zinc salts such as calcium hydroxide, calcium oxide, zinc oxide and the like can be used. Calcium salts of the reaction product of this invention are particularly useful in preparing relatively firm, dry and non-tacky protective coating films and zinc salts of the reaction product of this invention are particularly useful in preparing softer protective coating films.

Where the metal salt oxidate reaction product is desired, the oxidate as a starting material can be reacted with the metal salt forming compound and then with the polyamine as described above or the reaction product of the oxidate and the polyamine can be produced and then reacted with the basic salt described above in order to form the metal salt of the oxidate composition. Appropriate reaction procedures for the formulation of the oxidate reaction product in the metal salt form can be by simply mixing, in any order, the reactants, with stirring, at about room temperature to about 400° F. (204.5° C.), more generally at about 150° to about 220° F. (75.5° to 104.5° C.).

A suitable amount of the compound for forming the salt to the oxidate reaction product can range from about 90% to about 150% equivalency, preferably 100% to 125% equivalency, based on the acid number of the oxidate reaction product.

Alternatively, where the metal salt oxidate reactant product is desired, the metal salt forming compound, the oxidate starting material and the polyamine can all be combined and reacted simultaneously to obtain the salt of the oxidate reaction product. Where a simultaneous reaction is accomplished, appropriate parameters can be selected from those given above.

Conventional additives such as petroleum sulfonates, thinners, organic clays, pigments and the like for known purposes and in conventional amounts can also be added to the compositions of this invention to produce a broad range of different types of useful products.

The following examples are given to illustrate the present invention in greater detail. These examples are to be construed as merely exemplary and non-limiting. Unless otherwise indicated, all parts, percents, ratios, and the like are by weight.

COMPARATIVE EXAMPLE 1

A hydrocarbon wax oxidate with an acid number of 91.0, produced by conventionally oxidizing a hydrocarbon wax starting material was used.

Light petroleum naphtha (226.0 grams) was placed in a 1 liter beaker and stirred. 14.1 (0.381 eq.) of lime, in a powder form, was dusted into the naphtha with continuous mixing to form a lime slurry. The lime slurry was heated to 150° F. (65.5° C.) and 235 grams (0.381 eq.) of the hydrocarbon wax oxidate described above was melted and slowly added thereto with stirring with the temperature being maintained at 220°–230° F. (104.5°–110° C.). The hydrocarbon wax containing slurry was kept at this temperature for one half hour with stirring and then allowed to cool to room temperature.

A slight foaming was observed along with a slight thickening and darkening of the color of the composition. No deposition of lime was noted at the bottom of the beaker initially but over a period of time, settling of lime was observed. The mixture obtained was slightly grainy, cloudy and thinnish with some lime fallout and possibly some sub-reaction product dropout.

EXAMPLE 1

The same procedures as set forth in Comparative Example 1 were repeated except that 11.5 grams (0.381 eq.) of ethylene diamine was added to the mixture immediately after the hydrocarbon wax oxidate was added.

Some foaming was observed and the temperature increased rapidly to 180°–216° F. (82°–102° C.).

After cooling, the mixture had a high viscosity and was very thick. The product was so thick that it was difficult to scrape off the stirrer and was found to be insoluble in toluene and water. No lime or soap fallout was observed.

EXAMPLE 2

The same procedures as set forth in Comparative Example 1 were repeated except that 16.4 grams (0.381 eq.) of piperazine was added right after the hydrocarbon wax oxidate addition. A slight foaming was observed but no significant temperature increase was observed.

The mixture formed on cooling was very thick and had a high viscosity. No lime or soap fallout was observed.

EXAMPLE 3

The procedures of Example 1 were repeated except that the lime addition was omitted.

The temperature of the mixture immediately increased from 170° to 225° F. (76.5°–107° C.) with a thickening of the viscosity. The mixture darkened and a slight foaming was observed. An extremely thick product was obtained.

EXAMPLE 4

The procedures of Comparative Example 1 were repeated except that 14.4 grams (0.381 eq.) of tetraethylene pentamine was added just after the lime addition. A slight increase in temperature from 210° to 225° F. (90°–107° C.) occurred.

A sudden thickening and viscosity increase were observed with some small amount of foam. No lime or soap fallout was observed.

The product obtained was extremely viscous to the extent that when 150 grams of the product obtained, which was non-flowable, was mixed with 130 grams of light petroleum naphtha, the product still was extremely viscous.

EXAMPLE 5

The procedures of Example 4 were repeated except that no lime was employed. After adding the first few grams of the tetraethylene pentamine, a salt was formed but such disappeared after the addition of the remainder of the tetraethylene pentamine. The temperature increased to 240° F. (115.5° C.) and the mixture became thick with some foaming observed. A very high viscosity product was obtained.

EXAMPLE 6

The procedures of Example 1 were used except that no lime was employed and instead of the hydrocarbon wax oxidate as described in Example 1, a hydrocarbon wax oxidate having an acid number of 91.0 and a saponification number of 200.4 was employed and mixed with 150 cc of mixed xylenes rather than the light petroleum naphtha. 9.2 grams (0.243 eq. based on the five functional groups in the tetraethylene pentamine) of tetraethylene pentamine was employed and such was azeotropically distilled with the xylene to remove water. 5.5 cc of water in 6 hours was obtained and the water, when tested with litmus paper, was essentially neutral. The product obtained was a very nice gel.

EXAMPLE 7

The same procedure as described in Example 1 above was repeated using 150 grams (0.243 eq.) of the same type of hydrocarbon wax oxidate as employed in Example 1 and 150 cc of mixed xylenes. To this, was added 0.5 grams (0.018 eq.) of tetraethylene pentamine and azeotropic distillation was conducted. 2.0 cc of water was obtained in the first three hours and 0.3 cc of water after 6 additional hours. The mixture was a gel-like solid at room temperature demonstrating the thickening effect of the amine.

EXAMPLE 8

The same procedures of Example 7 were repeated except that an azeotropic distillation was conducted on the hydrocarbon wax oxidate/xylene mixture prior to addition of the amine with 1.6 cc of water being obtained in about an hour and 0.6 cc of water being obtained after 3 additional hours. Then, 0.067 grams (0.002 eq.) of tetraethylene pentamine were added and, on azeotropic distillation, less than 0.1 cc of water was obtained in 3.5 hours.

The mixture was a gel-like solid at room temperature demonstrating the thickening effect of the amine.

EXAMPLES 9-14

The same procedures were repeated as in Example 8 above, using various polyamines and in various amounts as set forth in the following table.

In each case, the reaction product obtained was gel-like at room temperature.

TABLE 1

| Example | Polyamine | Amount |
| --- | --- | --- |
| 9 | Tetraethylene Pentamine | 6.6 g (0.243 eq.) |
| 10 | Triethylene Tetramine | 5.9 g (0.243 eq.) |
| 11 | Diethylene Triamine | 5.0 g (0.243 eq.) |

TABLE 1-continued

| Example | Polyamine | Amount |
| --- | --- | --- |
| 12 | Ethylene Diamine | 3.7 g (0.243 eq.) |
| 13 | Tetraethylene Pentamine | 3.3 g (0.122 eq.) |
| 14 | Tetraethylene Pentamine | 13.2 g (0.486 eq.) |

EXAMPLE 15

150 g (0.243 eq.) of a hydrocarbon wax oxidate having an acid number of 91.0 and a saponification number of 196.4 was mixed with 150 cc of mixed xylenes. The mixture was brought to reflux to remove water present in the hydrocarbon wax oxidate using a Dean-Stark trap. 1.6 cc of water, acidic to litmus, was obtained in 2 hours. 9.0 g. (0.243 eq.) lime was added thereto and refluxing of the mixture was continued with 4.4 cc of water being removed in 2 hours.

Then, 6.6 g. (0.243 eq.) tetraethylene pentamine was added and the refluxing continued to collect 4.1 cc of water from the amine, a condensation reaction being conducted in 3–4 hours. The product obtained was a gel at room temperature but when warmed up could be poured. No lime or soap fallout was observed.

COMPARATIVE EXAMPLE 2

1000 grams of a light petroleum naptha was placed in a 4 liter beaker and 65.5 g (1.61 eq.) of zinc oxide was added to the beaker with stirring. The zinc oxide slurry was then heated to 150° F. (65.5° C.). Then, 1000 g. (1.61 eq.) of a hydrocarbon wax oxidate having an acid number of 90.5 was melted and slowly added to the zinc oxide slurry and the mixture was heated to 200° to 220° F. (93°–104.5° C.) for 1 hour with stirring. The source of heat was then removed and the mixture was allowed to cool, with stirring to 120° F. (49° C.). The slurry initially had a white color and then became coffee cream colored and then dark and subsequently dark and clear.

EXAMPLE 16

1000 grams of the zinc salt of the hydrocarbon wax oxidate produced in Comparative Example 2 above was heated to 200° F. (93° C.) to which was added 3 g. (0.3%) tetraethylene pentaamine with stirring and the temperature held at 200°–220° F. (93°–104.5° C.) for ½ hour. The mixture was removed from the heat and, with stirring, allowed to cool to 120° F. (49° C.).

COMPARATIVE EXAMPLE 3

The procedures of Comparative Example 2 were repeated but using 15.4 g. (0.38 eq.) of zinc oxide.

EXAMPLE 17

The procedures of Example 16 were repeated but using 1000 g of the zinc salt of the hydrocarbon wax oxidate produced in Comparative Example 3 above.

COMPARATIVE EXAMPLE 4

The procedures of Comparative Example 2 were repeated but using 1000 g. (0.80 eq.) of a 90:10 by weight mixture of a hydrocarbon wax oxidate and a petrolatum oxidate, the mixture having an acid number of approximately 45 and further, 32.7 g. (0.80 eq.) of zinc oxide was employed.

EXAMPLE 18

The procedures of Example 16 were repeated except that 1000 g. of the zinc salt of the hydrocarbon wax oxidate/petrolatum oxidate produced in Comparative Example 4 above was employed.

COMPARATIVE EXAMPLE 5

To a 4 liter beaker containing 1000 g. of light petroleum naphtha, 49.9 g. (120% of stoichiometric) of lime was added and the slurry heated to about 150° F. (65.5° C.). To this, 1000 g of a molten mixture of a hydrocarbon wax oxidate and a petrolatum oxidate, the mixture having an acid number of 63.1, was added, with stirring and the mixture was heated to 200°–220° F. (93°–104.5° C.) for 1 hour. The mixture was removed from the source of heat and stirred for about 5 minutes and allowed to cool, with stirring, to about 120° F. (49° C.).

EXAMPLE 19

276.1 g. of the calcium salt of the hydrocarbon wax oxidate/petrolatum oxidate mixture produced in Comparative Example 5 above was employed and to this 0.28 g. (0.1%) of tetraethylene pentamine was added thereto prior to removal from the source of heat.

COMPARATIVE EXAMPLES 6–8 AND EXAMPLES 20–26

Procedures similar to those described above were employed to produce calcium salts of hydrocarbon wax oxidates and to produce compositions of this invention further containing a polyamine reacted with calcium salts of the hydrocarbon wax oxidates. The components employed, their characteristics and amounts, and other various characteristics of the products produced are shown in Table 2 below.

TABLE 2

| Ex. No. | Hydrocarbon Wax Oxidate A.N. | Amine | Amine Amount g | Amine Amount Eq. | Lime Amount g | Lime Amount Eq. | Lime Dropout | Physical Appearance | Viscosity Fresh | Viscosity Aged |
|---|---|---|---|---|---|---|---|---|---|---|
| C. Ex. 6 | 91.0 | None | 0 | 0 | 14.1 | 1.0 | slight | slightly grainy | moderate | heavy |
| Ex. 20 | 91.0 | H$_2$NCH$_2$CH$_2$NH$_2$ | 11.5 | 1.0 | 14.1 | 1.0 | none | homogen. | heavy | very heavy |
| Ex. 21 | 91.0 | Piperazine | 16.4 | 1.0 | 14.1 | 1.0 | none | homogen. | heavy | very heavy |
| Ex. 22 | 91.0 | H$_2$NCH$_2$CH$_2$NH$_2$ | 11.5 | 1.0 | 0 | 0 | none | homogen. | heavy | very heavy |
| Ex. 23 | 91.0 | TEPA | 14.4 | 1.0 | 14.1 | 1.0 | none | homogen. | very heavy | solid |
| Ex. 24 | 91.0 | TEPA | 14.4 | 1.0 | 0 | 0 | none | homogen. | heavy | very heavy |
| Ex. 25 | 91.0 | TEPA | 0.8 | 0.056 | 14.1 | 1.0 | none | homogen. | moderate | heavy |
| Ex. 26 | 91.0 | TEPA | 1.0 | 0.069 | 14.1 | 1.0 | none | homogen. | heavy | very heavy |
| C. Ex. 7 | 91.0 | Adogen 170D | 15.2 | 0.738 | 6.8 | 1.0 | none | homogen. | moderate | heavy |
| C. Ex. 8 | 91.0 | Adogen 170D | 20.6 | 1.0 | 6.8 | 1.0 | none | homogen. | moderate | heavy |

Note:
A.N. = acid number
Adogen 170D = a commercially available long chain primary monoamine produced by Ashland Chemical Company.
Aged viscosity was determined after about 24 hours.

COMPARATIVE EXAMPLES 9 AND 10 AND EXAMPLES 27–30

Using procedures similar to those described above, calcium salts of hydrocarbon wax oxidates were produced and various polyamines as indicated in Table 3 below in the amounts indicated in Table 3 below were reacted therewith to produce reaction products of the polyamines indicated in Table 3 below. The viscosity of the resulting products were obtained and are also shown in Table 3 below. 2-Ethylhexyl amine, as a primary monoamine, was employed for comparative purposes to demonstrate further the effects of the polyamine as opposed to a primary monoamine.

TABLE 3

| Comparative Ex. or Ex. No. | Amine Additive | Equivalents of Additive | Reaction Temp. Used for Reaction Product | Brookfield Viscosity (CPS) 2 rpm | Brookfield Viscosity (CPS) 20 rpm |
|---|---|---|---|---|---|
| C. Ex. 9 | None | None | 200–220° F. | 5,600 | 5,200 |
| Ex. 27 | Ethylenediamine | 0.0157 | 200–220° F. | 164,000 | 120,000 |
| Ex. 28 | Tetraethylene pentamine | 0.0157 | 200–220° F. | 38,000 | 36,000 |
| Ex. 29 | Piperazine | 0.0157 | 200–220° F. | 45,000 | 44,000 |
| Ex. 30 | 1,6-Hexanediamine | 0.0157 | 200–220° F. | 60,000 | 59,000 |
| C. Ex. 10 | 2-Ethylhexylamine | 0.0157 | 200–220° F. | 5,200 | 5,000 |

While the invention has been described in detail and with respect to specific embodiments thereof, it will be apparent that changes and modifications can be made therein without departing from the spirit and scope thereof.

What is claimed is:

1. A petrolatum or hydrocarbon wax oxidate composition having a sinewy or film-forming characteristic comprising the reaction product of:
   (a) a hydrocarbon wax oxidate, a petrolatum oxidate or a mixture of said hydrocarbon wax oxidate and said petrolatum oxidate, with
   (b) a polyamine containing at least two amino groups, each group having at least one active hydrogen atom; or the metal salt of said reaction product.

2. The composition of claim 1, wherein said oxidate (a) is the oxidation product of a hydrocarbon wax or petrolatum having an acid number ranging from about 20 to about 150.

3. The composition of claim 1, wherein said reaction product is said hydrocarbon wax oxidate.

4. The composition of claim 1, wherein said reaction product is said petrolatum oxidate.

5. The composition of claim 1, wherein said reaction product is said mixture of said hydrocarbon wax oxidate and said petrolatum oxidate.

6. The composition of claim 1, wherein said reaction product is the metal salt of said hydrocarbon wax oxidate.

7. The composition of claim 1, wherein said reaction product is the metal salt of said petrolatum oxidate.

8. The composition of claim 1, wherein said reaction product is the metal salt of said mixture of said hydrocarbon wax oxidate and said petrolatum oxidate.

9. The composition of claim 1, 2, 3, 4, 5, 6, 7 of 8, wherein said polyamine is a diamine, a triamine, a tetramine or a pentamine.

10. The composition of claim 1, 2, 3, 4, 5, 6, 7 or 8, wherein said polyamine is an aliphatic polyamine, an alicyclic polyamine, an aromatic polyamine or a heterocyclic polyamine.

11. The composition of claim 1, 2, 3, 4, 5, 6, 7 or 8, wherein said polyamine is triethylene tetramine, diethylene triamine, tetraethylene pentamine, hexamethylene diamine, ethylene diamine, or piperazine.

12. The composition of claim 1, 2, 3, 4, 5, 6, 7, or 8, wherein said polyamine is tetraethylene pentamine.

13. The composition of claim 1, 2, 3, 4, 5, 6, 7, or 8, wherein said polyamine is a polyfunctional amino group containing nitrogen compound from hydrogenated coal or shale oil.

14. The composition of claim 1, 2, 3, 4, 5, 6, 7, or 8, wherein said composition has a viscosity ranging from about 1000 to about 250,000 CPS at about 25° C.

15. The composition of claim 1, 2, 3, 4, 5, 6, 7, or 8, wherein said metal salt is a salt of lithium, sodium, potassium, magnesium, rubidium, strontium, cesium, barium, cadmium, aluminum, tin, bismuth or zinc.

16. The composition of claim 1, 2, 3, 4, 5, 6, 7, or 8, wherein said salt is the calcium salt or the zinc salt.

17. The composition of claim 1, 2, 3, 4, 5, 6, 7, or 8, wherein said salt is the calcium salt.

18. A method for altering the characteristics of petrolatum or hydrocarbon wax oxidates or the metal salts thereof comprising forming the reaction product of:
(a) a hydrocarbon wax oxidate, a petrolatum oxidate, or a mixture of said hydrocarbon wax oxidate and said petrolatum oxidate, with
(b) a polyamine having at least two amino groups, each group having at least one active hydrogen atom;
or a metal salt of said reaction product, by reacting, in any order, said oxidate (a) and said polyamine (b) and, if necessary, forming said metal salt prior to or subsequent to said reacting of said oxidate (a) and said polyamine (b).

19. The method of claim 18, wherein said polyamine is a diamine, a triamine, a tetramine or a pentamine.

20. The method of claim 18, wherein said polyamine is an aliphatic polyamine, an alicyclic polyamine, an aromatic polyamine or a heterocyclic polyamine.

21. The method of claim 18, wherein said polyamine is triethylene tetramine, diethylene triamine, tetraethylene pentamine, hexamethylene diamine, ethylene diamine, or piperazine.

22. The method of claim 18, wherein said polyamine is tetraethylene pentamine.

23. A method of producing a petrolatum or hydrocarbon wax oxidate composition comprising reacting simultaneously or in any order:
(a) a hydrocarbon wax oxidate, a petrolatum oxidate or a mixture of said hydrocarbon wax oxidate and said petrolatum oxidate, and
(b) a polyamine having at least two amino groups, each group having at least one active hydrogen atom.

24. A method of producing a metal salt of a petrolatum or hydrocarbon wax oxidate composition comprising reacting simultaneously or in any order:
(a) a hydrocarbon wax oxidate, a petrolatum oxidate or a mixture of said hydrocarbon wax oxidate and said petrolatum oxidate;
(b) a polyamine having at least two amino groups, each group having at least one active hydrogen atom, and
(c) a metal salt forming compound.

25. The method of claim 23 or 24, wherein said oxidate (a) is the oxidation product of a hydrocarbon wax or petrolatum having an acid number ranging from about 20 to about 150.

26. The method of claim 23 or 24, wherein said reaction product is said hydrocarbon wax oxidate.

27. The method of claim 23 or 24, wherein said reaction product is said petrolatum oxidate.

28. The method of claim 23 or 24, wherein said reaction product is said mixture of said hydrocarbon wax oxidate and said petrolatum oxidate.

29. The method of claim 24, wherein said reaction product is the metal salt of said hydrocarbon wax oxidate.

30. The method of claim 24, wherein said reaction product is the metal salt of said petrolatum oxidate.

31. The method of claim 24, wherein reaction product is the metal salt of said mixture of said hydrocarbon wax oxidate and said petrolatum oxidate.

32. The method of claim 23 or 24, wherein said polyamine is a diamine, a triamine, a tetramine or a pentamine.

33. The method of claim 23 or 24, wherein said polyamine is an aliphatic polyamine, an alicyclic polyamine, an aromatic polyamine or a heterocyclic polyamine.

34. The method of claim 23 or 24, wherein said polyamine is triethylene tetramine, diethylene triamine, tetraethylene pentamine, hexamethylene diamine, ethylene diamine, or piperazine.

35. The method of claim 23 or 24, wherein said polyamine is tetraethylene pentamine.

36. The method of claim 23 or 24, wherein said polyamine is a polyfunctional amino group containing nitrogen compound from hydrogenated coal or shale oil.

37. The method of claim 24, 29, 30 or 31, wherein said metal salt is a salt of lithium, sodium, potassium, magnesium, rubidium, strontium, cesium, barium, cadmium, aluminum, tin, bismuth or zinc.

38. The method of claim 24, 29, 30 or 31, wherein said salt is the calcium salt or the zinc salt.

39. The method of claim 24, 29, 30 or 31, wherein said salt is the calcium salt.

* * * * *